N. C. WALLENTHIN.
JOINT FOR BRACELETS.
APPLICATION FILED NOV. 23, 1912.
1,056,074.
Patented Mar. 18, 1913.
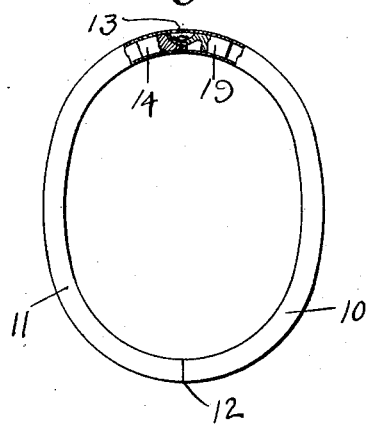
Fig. 1.
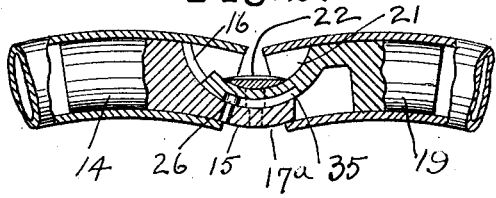
Fig. 2.
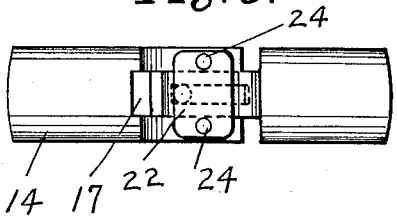
Fig. 3.
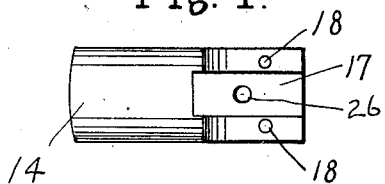
Fig. 4.
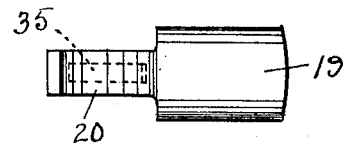
Fig. 5.
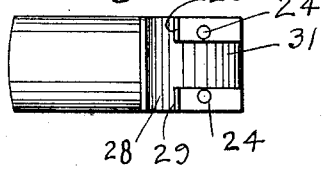
Fig. 6.
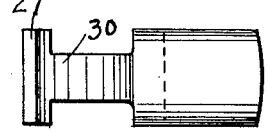
Fig. 8.
Fig. 7.
Fig. 10.
Fig. 9.
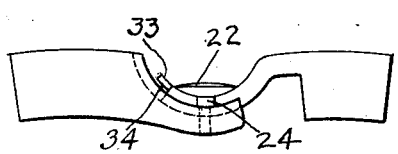
Fig. 11.
Witnesses
W. H. Bardsley.
E. D. Ogden
Inventor
Nils C. Wallenthin
By Howard E. Barlow
Attorney

UNITED STATES PATENT OFFICE.

NILS C. WALLENTHIN, OF ATTLEBORO, MASSACHUSETTS.

JOINT FOR BRACELETS.

1,056,074.         Specification of Letters Patent.         Patented Mar. 18, 1913.

Application filed November 23, 1912. Serial No. 733,045.

*To all whom it may concern:*

Be it known that I, NILS C. WALLENTHIN, a citizen of the United States, and resident of the town of Attleboro, in the county of Bristol and State of Massachusetts, have invented certain new and useful Improvements in Joints for Bracelets, of which the following is a specification.

This invention relates to joints for bracelets, and has for its object to provide such a joint constructed of a tongue and a grooved member, each having reduced and curved end portions, the tongue members being mounted to slide in the groove of the grooved member and said two members being bound together by a cross bar extending over the tongue and secured to the grooved member on both sides of said tongue thereby providing a joint of great strength and perfect in its operation.

A further object of the invention is to provide an extension on one of said members arranged to engage the other member to form a stop to limit the opening movement of said members.

With these and other objects in view, the invention consists of certain novel features of construction, as will be more fully described and particularly pointed out in the appended claims.

Of the accompanying drawings: Figure 1— shows the bracelet in its closed position with a portion broken away disclosing the joint members. Fig. 2— is an enlarged sectional side elevation of the joint members in open position inserted in the adjacent ends of the tubular bracelet arms. Fig. 3— is a top plan view of the two joint members in operative position. Fig. 4— is a detail top plan view of the groove member. Fig. 5— is a detail top plan view of the tongue member. Fig. 6— is a top plan view of the groove member showing the groove formed in a T-shape. Fig. 7— is a sectional side elevation of said groove member having a T-slot. Fig. 8— is a top plan of the tongue member showing the tongue with a T-shaped end. Fig. 9— is a side elevation of said tongue member. Fig. 10— is a perspective view of the securing cross bar. Fig. 11— is a modification illustrating the T-head of the tongue member as adapted to engage the rivet pins of the securing cross bar to form a stop to limit the opening movement of the members.

Referring to the drawings, 10 and 11 designate the two halves or arms of the bracelet which are preferably constructed of tubing and bent into the form to fit loosely around the wrist or arm of the wearer. In bracelets of the character illustrated it is customary to divide the same into two parts or arms and hinge these parts so that they may be separated or opened to permit the bracelet to be readily passed onto the arm and then closed and locked, the halves being arranged to separate at the point 12 and to swing on the hinge or joint member which is inserted into the tubing at the point 13.

My improved bracelet joint is constructed of two interlocking members which may be formed integral with the adjacent ends of the bracelet arms or they may be constructed separate and independent of said arms and subsequently inserted and secured in the tubing. The body portion of both of the joint members are preferably constructed of sheet metal folded and bent to conform to the shape of and be inserted in the tubing. The member 14, designated as the groove member, is preferably constructed with its end portion 15 reduced and bent or swaged so that both its inner face 16 and outer face 17ª is formed on the arc of a circle, said inner face 16 being provided with a central longitudinal groove 17 and also with holes 18—18 which are formed on each side of said groove for the purpose presently described. The opposite member 19, designated as the tongue member, is provided with a forwardly extending tongue portion 20 also formed on the arc of a circle on one face to correspond with the circular face of the groove 17 in the member 14 and is adapted to fit and slide in said groove obtaining a bearing on either side thereof to guide the tongue and permit a free sliding movement of the parts one upon the other but preventing any side or lateral movement thereof. The outer face 21 of this tongue is also made in a correspondingly circular shape and the two members are held in position one upon the other by means of a cross bar 22, which as illustrated in Fig. 10 has an underface 23 of a form adapted to fit into the circular portion 21 of said tongue, and rivet pins 24 are arranged to pass from each end of said bar through the opening or holes 18 on either side of the tongue, thereby firmly supporting and operatively binding the two members together.

In order to prevent the members from being drawn apart endwise one from the other I have provided a stop for limiting their opening motion. The first four views illustrate one form of stop wherein a pin 26 is formed on the upper face of the groove member and adapted to enter said slot 35 in the tongue whereby the opening motion of the members is limited. Another construction accomplishing the same purpose is illustrated in Figs. 6 to 9 inclusive, which is that of forming a T-head 27 on the tongue 30, the lateral extensions of which head are adapted to engage and fit into a correspondingly formed aperture 28 which communicates with the groove portion 31, whereby said tongue may slide back and forth in the grooves 28 and 31 and bring up against the shoulders 29 in the groove to limit the opening movement of the members. Or in some cases, as illustrated in Fig. 11, the T-portion of the head at 33 is undercut as at 34 thus obviating the necessity of the transverse groove 28, as shown in Figs. 6 and 7, and in this construction the walls of the T are arranged to bring up against the pins 24 of the bar 22 to limit the opening movement of the parts.

By constructing a bracelet in my improved manner, one with a deep groove and the other with a tongue adapted to slide in said groove, and to hold and secure the two members in slidable relation one upon the other by means of a transverse or cross bar secured at both ends and at both sides of said tongue, the joint is made very strong and durable and cannot be readily twisted or forced out of alinement one with the other. In this construction I do not limit myself to the exact form of stop for limiting the opening movement of the members.

My improved joint is very simple and inexpensive in construction and effective in its operation.

I claim:

1. In a bracelet, a joint formed of a groove member and a tongue member, the end of said groove member being reduced and its working surface formed on a curve, said curved surface having a central longitudinal groove, the tongue member having a forwardly extending tongue curved on its upper and lower surfaces to conform to the curvature of the groove member and adapted to slide and be guided in said groove in the first mentioned member, a retaining bar extending transversely across said tongue in its upper curved surface and secured at each end to said grooved member on each side of said tongue to operatively secure the two members together, and a projection on one of said members adapted to engage a portion of the other member to limit their opening motion.

2. In a bracelet, a joint formed of two members slidably hinged together the end of one of said members being reduced and curved on its upper face said curved surface having a central longitudinal groove, the other of said members having a forwardly extending T-shaped tongue curved on both its upper and lower surfaces to conform to the curvature of the groove member and adapted to slide and be guided in said groove in the first member, a retaining bar extending transversely across said tongue and engaging its upper curved surface and secured at each end to said first member on each side of said tongue to operatively bind the two members together, and means in the first named member to be engaged by the T-head of the tongue to limit the opening motion of said members.

3. In a bracelet, a joint formed of two members slidably hinged together the end of one of said members being reduced and curved on its upper face, said curved surface having a T-shaped groove, the other of said members having a forwardly extending T-shaped tongue curved on both its upper and lower surfaces to conform to the curvature of the groove members and adapted to slide and be guided in said corresponding groove in the first member, a retaining bar extending transversely across said tongue and engaging its upper curved surface and having a pin in each end riveted into said first member on each side of said tongue to operatively secure the two together, the T-head of the tongue bringing up against the walls of the T slot in the other to limit the opening motion of said members.

In testimony whereof I affix my signature in presence of two witnesses.

NILS C. WALLENTHIN.

Witnesses:
 HOWARD E. BARLOW,
 E. I. OGDEN.

Copies of this patent may be obtained for five cents each, by addressing the "Commissioner of Patents, Washington, D. C."